March 28, 1961  T. M. CALANDRA  2,977,079
HOIST, AIRCRAFT SEAT REMOVAL

Filed Dec. 18, 1959  4 Sheets-Sheet 1

INVENTOR.
THOMAS M. CALANDRA
BY
ATTORNEYS

March 28, 1961 T. M. CALANDRA 2,977,079
HOIST, AIRCRAFT SEAT REMOVAL
Filed Dec. 18, 1959 4 Sheets-Sheet 2

INVENTOR.
THOMAS M. CALANDRA
BY
ATTORNEYS

United States Patent Office 2,977,079
Patented Mar. 28, 1961

2,977,079

HOIST, AIRCRAFT SEAT REMOVAL

Thomas M. Calandra, Box 69, Rosamond, Calif.

Filed Dec. 18, 1959, Ser. No. 860,611

5 Claims. (Cl. 244—122)

(Granted under Title 35, U.S. Code (1952), sec. 266)

The invention described herein may be manufactured and used by or for the United States Government for governmental purposes without payment to me of any royalty thereon.

This invention is basically a hoist for the purpose of removing, installing and "free fall" checking of downward ejection pilot seats for high speed aircrafts.

These types of ejection seats include a pair of downwardly, and sometimes slightly rearwardly inclined, spaced side channels in which the ejection seat is mounted. When ejection of the seat is necessary the seat is released and projected downwardly along these side guide channels into the slip stream below the aircraft, also if it is desired to remove or replace the seat and its mounting it is usually released and it can then slide down the side guide channels and out through a suitable opening in the bottom of the fuselage. Since the means for ejecting the pilot seat from the airplane forms no part of the subject invention it will be referred to only very generally.

These seats are unhandy and somewhat difficult to handle, usually requiring two men to remove or install the seat from below and many costly accidents have occurred in the Air Force, some of them resulting in fatalities, due to the need for personnel under the seat.

With the subject invention these downward ejection seats can be raised and lowered on their guide channels and removed and elevated in proper position with ease and convenience by a single person and without any danger of damage to the aircraft and equipment or likelihood of injury to the personnel and can be held in any position while adjustment and connection are made between the seat and the aircraft.

An object of the invention is therefore a device in the form of a hoist which includes means for connecting the same to the guide channels and to a downward ejection seat which is carried in the channels so that the ejection seat may be removed or elevated in position in the guide channels for the seat without the necessity of aircraft personnel being below the seat or directly handling the seat during the lowering or raising of the seat in the aircraft.

A further object is the provision of a hoist device of special construction whereby the device may be quickly and easily applied to the upper end portion of the ejection seat guide channel and firmly secured thereto and includes a cable winch and connection means located above the ejection seat and cable means including means for removably securing the cable means to the upper portion of the ejection seat.

A further object includes crank and ratchet means for rotating and latching the winch to retain the seat in any elevated position on its channel guide means.

A still further object includes a winch or hoist frame comprising spaced side channels adapted to inclose the spaced guide channels for the seat in which the frame is separable so that the spaced guide channels can be received into the side channels of the winch frame and means for tying the separable side channels together on the guide channels.

A further object includes stop means in the separable side channels to engage the upper ends of the guide channel to dispose the winch device in position on the upper ends of the guide channels against downward movement during lowering and elevation of an ejection seat on the guide channels.

A further object is to provision of a winch frame which is telescopic over the ends of the guide channels of an aircraft ejection seat structure and includes winch and cable means for connection to the upper end of an ejection seat including means for maintaining the pull load of the cable at all times substantially parallel to direction of movement of the ejection seat and substantially midway between the two spaced guide channels.

A further object includes the provision of a modified arrangement in which the frame is a one-piece, non-separable construction in which the frame can be conveniently slipped over the upper end portions of the ejection seat guide channels and includes separable clamping means for securing the lower ends of the side channels of the frame to the upper ends of the guide channels.

Other objects and advantages will become apparent from the following description and accompanying drawing in which like reference numerals refer to like parts on the several figures of the drawing.

Figure 1:
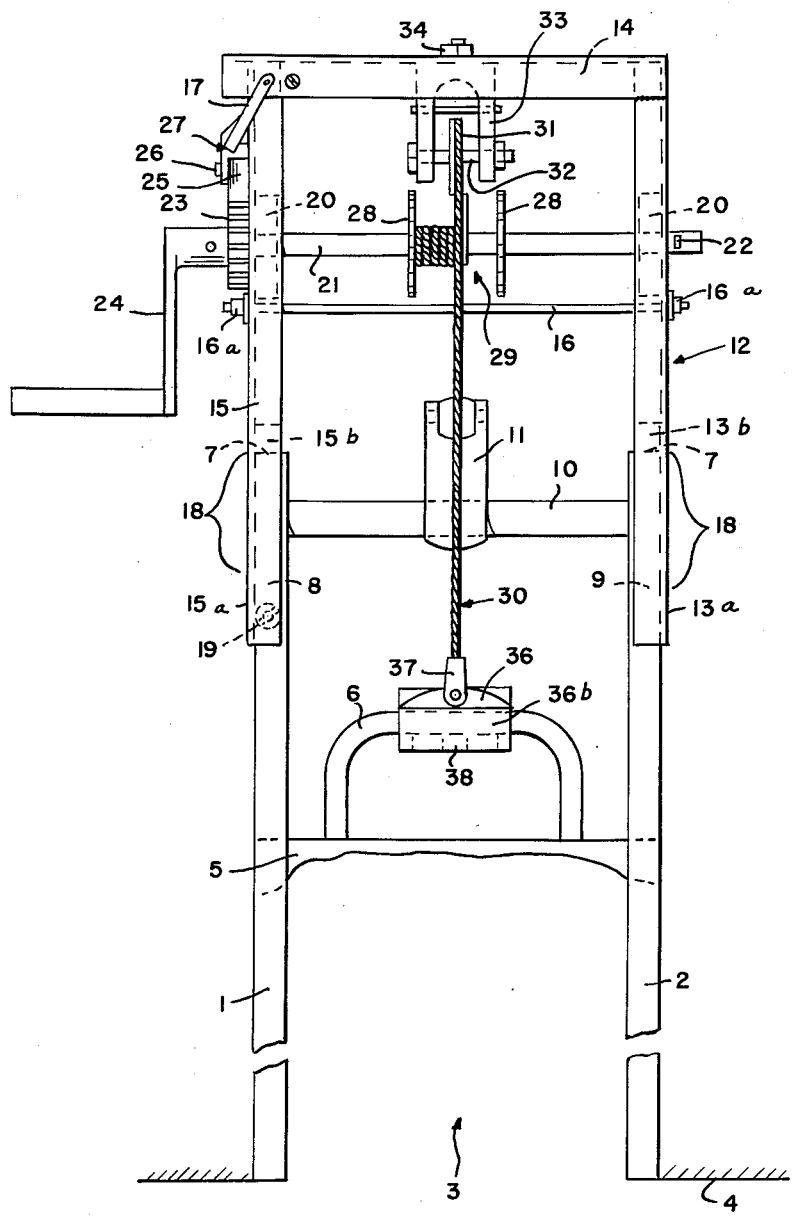
Fig. 1 is a view of the invention in front elevation, somewhat schematically showing a portion of the downward ejection seat guide channels and the upper portion of the ejection seat, parts being broken away.

In the drawing the reference numerals 1 and 2 denote a pair of spaced parallel, slightly inclined U-shaped ejection seat channels, extending downwardly to an opening 3 in the fuselage 4 of a high speed aircraft such as the F–104. The guide channels 1 and 2 face each other and constitute pilot seat rails for a pilot downward ejection seat schematically shown at 5 and having a head rest supporting bar 6.

The rails or guide channels 1 and 2 terminate at their upper ends at 7 and have rearwardly extending brackets 8 and 9 to which is secured the opposite ends of a strong cross bar 10, the cross bar having an upwardly and forwardly extending bifurcated bracket or arm 11 adapted to be connected to the downward ejection seat structure, this latter structure not forming a part of the invention, is not shown in detail or further described.

The preferred form of the invention comprising a separable rectangular U-shaped frame indicated generally at 12 comprising an L-shaped integral side channel 13 and end channel 14 and a separable opposite side channel 15.

The lower end portions 13$^a$ and 15$^a$ of side channels 13 and 14 are U-shaped channels shaped to fairly snug fit and secure the upper end portions of the seat tracks 1 and 2 and are each provided with a "stop" clip suitably fastened or welded thereto indicated at 13$^b$ and 15$^b$ to engage the ends 7 of the guide rails 1 and 2 and limit the downward movement of device 12 on the rails 1 and 2 during the manipulation of the ejection seat.

The separable side channel 15, as shown, is firmly secured in place when assembled on the top portions of the guide rails or tracks 1 and 2 by a tie bolt extending through the base of the U-shaped channels and having at least one threaded end and a nut or nuts 16$^a$ for drawing the channels toward each other against the outer sides of the tracks 1 and 2, the securing means also including a removable locking pin 17 which extends through aligned apertures in the overlapping ends of the end channel and side channel 15.

The back flanges of the two channel members 13 and 15 are cut away to receive the rearwardly extending brackets 8 and 9, this cutaway portion extending between the points indicated at 18 in Fig. 1, and a screw clamp 19 is provided in the lower end of the back flange of at least one of the two side channels 13 and 15 so that the lower end of the frame 12 can be secured against the front face of the ejection seat track or guide channel 15.

Figure 2:
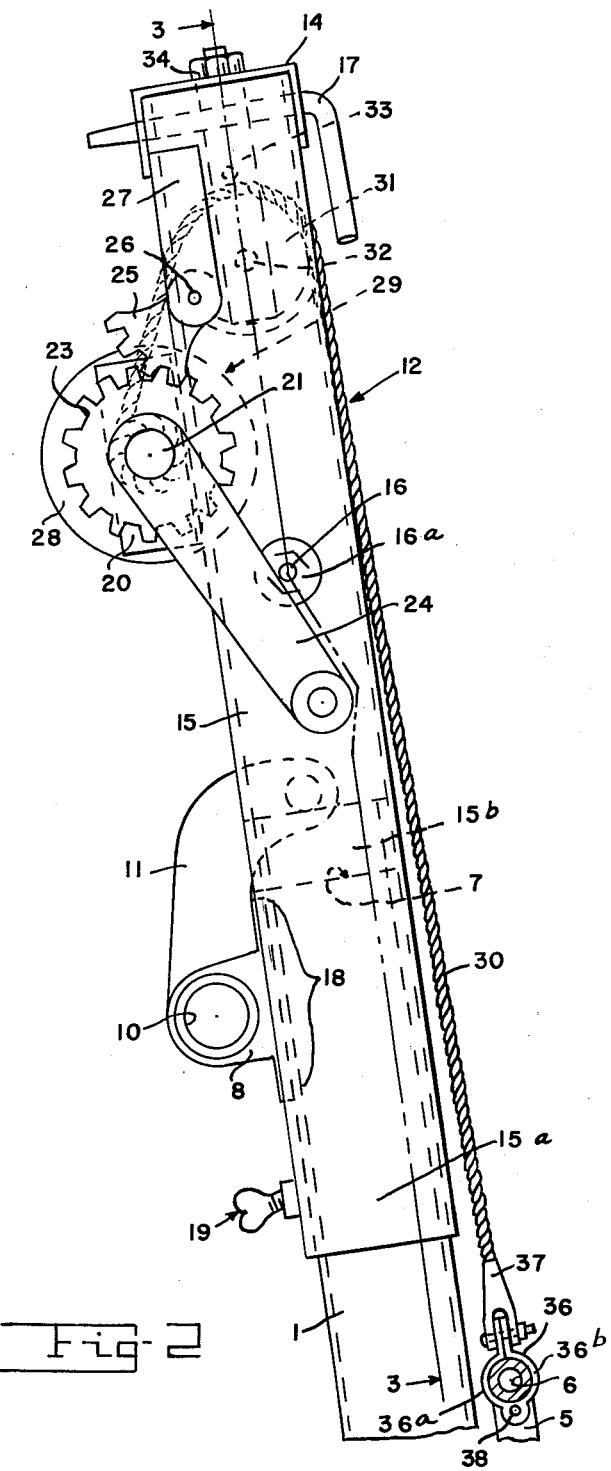
Fig. 2 is a fragmentary side elevation of a portion of the structure shown in Fig. 1, showing the ejection seat held in elevated condition by the ratchet.

Rearwardly extending brackets 20 are fixed to the rear faces of the channels 13 and 15 as shown in Figs. 1 and 2 in which is suitably journalled a windlass or winch shaft 21, the shaft 21 extending through and beyond the side channel 13 and provided with a retaining cotter pin 22. The offset end of the shaft 21 has a ratchet gear or wheel 23 fixed thereon adjacent the outer face of a separable channel 15 and the extremity of the shaft, as shown in Fig. 1, has an operating crank member 24 secured thereon for manually rotating the windlass shaft to position, and raise or lower the ejection seat 5 on or in the tracks 1 and 2.

A ratchet member or pawl 25 is provided for the ratchet gear, this pawl being suitably pivoted at 26 in a bracket 27 projecting from the outer face of the channel frame member 15.

Spaced disk members or plates 28 are fixed on the central portion of the shaft 21 forming with the intermediate portion of the shaft, a windlass or cable winding drum 29 on which the ejection seat raising and lowering cable 30 is wound, the upper end of the cable 30 being firmly secured to the shaft 21 intermediate the disk 28 forming the side flanges of the cable winding drum 29.

Located above the drum 29 and forwardly thereof is a cable guide pulley 31 which is journalled on cross shaft 32 carried in the lower end portion of a bifurcated pulley supporting bracket 33 that is secured to and depends from the center of the upper end channel, and may be secured to the channel by any suitable means, for instance by a nut 34 as shown in the drawing.

Referring to Fig. 1 the cable 30 passes upwardly from the rear of the cable winding drum 29 then forwardly around the pulley 31 and downwardly, parallel or almost parallel to the front flanges of the side channels 13 and 15, the lower end of the cable being separably connected or connectable to the center of the head rest bar 6 of the ejection seat frame 5 by a separable clamp plate 36 and clevis 37.

The clamp plate 36 preferably comprises two complemental elongated plates 36$^a$ and 36$^b$ shaped to loosely fit the head rest bar 6 and hinged together at 38 and secured to the clevis 37 by a bolt or suitable fastener 39.

When it is desired to use the device to remove or replace the ejection seat the frame 12 is placed on the upper end of the seat ejection guide channels or tracks 1 and 2 until the clips 13$^b$ and 15$^b$ rest on the top ends 7 of the tracks. This is accomplished by first removing the pin 17, one of the nuts 16$^a$ and withdrawing the cotter pin 22 from the wind shaft 21. The side channels or frame members 13 and 15 can now be separated and each of the channels slipped laterally over one of the guide rails 1 or 2 after which the pin 17 and tie bolt 16 are connected to hold the device in the position shown in Fig. 2. The clamp or clamps 19 can be tightened to secure the device on the ejection seat rails against any movement.

The clip or clamp 36 opened, passed around the seat head rest bar 6, closed, and connected to the clevis 37.

Now when the crank is operated (clockwise) to tension the cable 30 the ejection seat structure will be supported by the ejection seat adjustment arm removal device 12.

In the event of removal of the seat the ejection mechanism can now be disconnected, without the usual requirement of at least two men located below the aircraft and under the seat in order to safely lower the seat for adjustment or removal. As before mentioned it is somewhat dangerous for personnel to be under the seat during removals, adjustments, or replacements for obvious reasons.

The seat may now be safely and slowly lowered on its ejection rails by one man operating the crank 24 with the ratchet pawl 25 disengaged.

In replacement it is only necessary to place the seat below the aircraft, connect the clamp 36 and operate the crank 24 with the ratchet pawl engaged, little inconvenience is experienced in starting the ejection seat up its guide rails since the up pull on the cable is substantially in the direction of movement of the ejection seat structure in its guide channels or rails 1 and 2.

Of course, the seat structure is now raised and connected up from within the aircraft by one man without danger or liabilitiy of injury to personnel, or damage to the equipment, or its fit and movement or function in its tracks can be observed and corrected in a now obvious manner, after which the device 12 can be easily and quickly removed in a now obvious manner, by the release and removal of the side channel 15, after the clip 36 has been disconnected.

Figure 4:
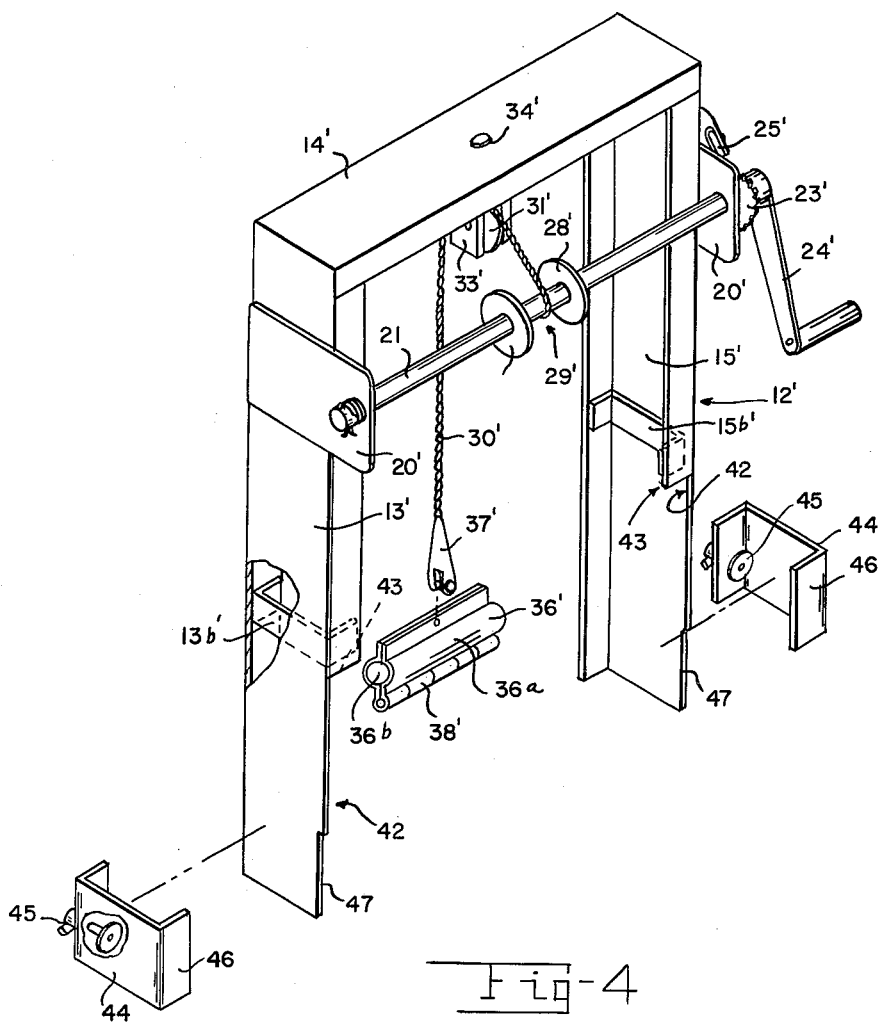
Fig. 4 is a perspective view of a slightly modified form of the invention shown in Figs. 1, 2 and 3, with the clamping members for the ejection seat guide channels and for the seat head rest bar detached.

In the form disclosed in Fig. 4 most of the structure is similar to that shown in the preceding figures of the drawing and these parts will be given the same numerals, but primed ('), the difference being that the frame members 13' and 15' are rigidly connected to the end frame member 14' and the lower portions of the rear flanges of the channels 13' and 15' are cut away at 42 so that the frame 12' can be slipped onto the upper ends of the guide tracks 1 and 2 transversely to the plane of the tracks, and then lowered a small amount to engage the tops 7 of the tracks under the remaining rear flanges of the channels 13' and 15' which extend downward slightly below the stop clips 13$^{b'}$ and 15$^{b'}$ and form the shoulders 43. Removable U-shaped clamp 44 having clamp screws 45. The side channels 13' and 15' are further notched or cut away at 47 to accommodate the flanges 46 on the clamps 44.

After the device 12' is placed on the ejection seat rails 1 and 2 with the brackets 8 and 9 extending through the cutaway portions 42 with the tops of the tracks engaging the clips 13$^{b'}$ and 15$^{b'}$ the two clamps 44 can be slipped over the lower ends of the side channels 13' and 15' and the clamp screws 45 turned to clamp the tracks 1 and 2 securely to the device.

Figure 3:
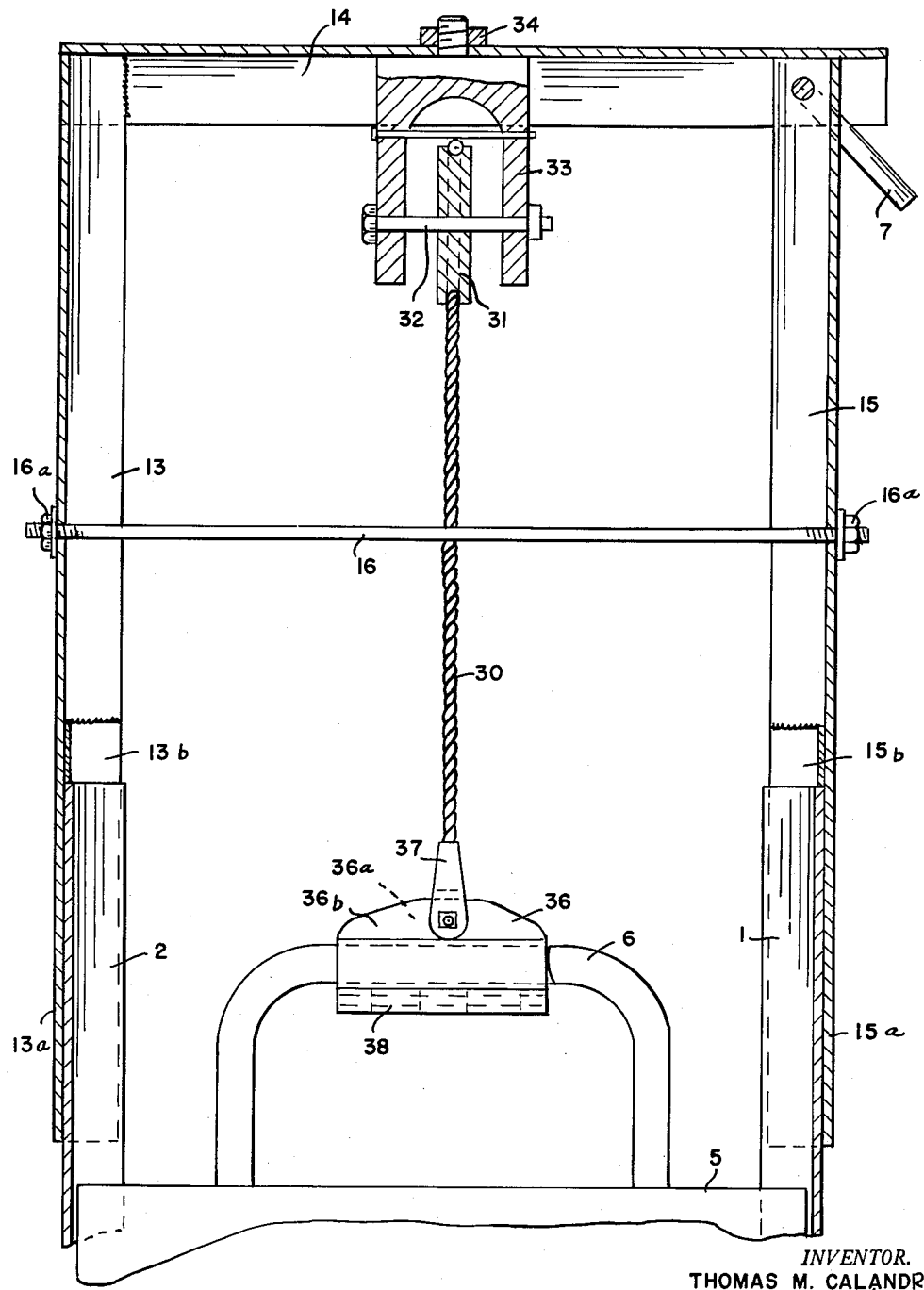
Fig. 3 is a vertical sectional view taken about on the plane indicated by line 3—3 in Fig. 2, looking in the direction of the arrows.

The raising, lowering and manipulation of the ejection seat is thereafter the same as set forth in connection with the device shown in Figs. 1, 2 and 3.

While I have illustrated a preferred embodiment and one modification other slight modifications may be made without departing from the spirit of the invention, and therefore I do not wish to be limited to the exact details of the construction set forth, but desire to avail myself of all changes within the scope of the appended claims.

Having thus described my invention, what I claim as new and desire to secure by Letters Patent of the United States is:

1. A winch device for raising and lowering a downward ejection seat in a pair of spaced parallel downward ejection seat guide rails in a high speed aircraft comprising a separable U-shaped channel frame comprising a pair of spaced side channel members facing each other in spaced parallel relation adapted to receive the upper end portions of the ejection seat guide rails therein, stop means on said side channel members for engagement with the guide rails to limit downward movement of the side channel members on the guide rails, an end frame channel member fixed to one of said side channel members normal thereto, said end frame channel member having its flanges facing downwardly for reception of the upper end of the other side frame channel member therebetween, removable locking means for separably securing said upper end of said other side frame channel in said end frame channel member, separable connecting means connected between said side frame channel members for removably tying the side frame channel members together intermediate the ends thereof, a cable drum shaft journalled on said side frame channel members, adjacent said end frame channel member, releasable ratchet means between one of said side frame channel members and said shaft, a cable drum fixed on said shaft intermediate said side frame channel members, a hoisting cable dead ended at one end in said drum and wound thereon, pulley supporting means fixed on said end frame channel member depending downwardly therefrom substantially midway between said side frame channel members, a pulley journalled on said pulley support with its axis substantially in a median plane between the flanges of both of said side frame channel members and parallel to the end frame channel member, said hoisting cable extending over said pulley and downwardly substantially parallel to said side frame channel members, and separable connecting means secured to the other or live end of said hoisting cable for connection to the upper portion of a downward ejection seat for the ejection seat guide rails, when the side frame channel members are mounted on the upper ends of the guide rails for the seat.

2. In combination with a downward ejection seat structure comprising spaced parallel U-shaped guide tracks facing each other disposed in a substantially vertical direction and a downward ejection seat slidably mounted in said guide tracks for free vertical movement, an inverted rectangular U-shaped winch frame comprising spaced U-shaped side channel members facing each other in parallel relation receiving the upper end portions of the guide tracks therein in telescopic fashion, stop means in said side channels thereon for limiting telescoping action to limit the downward telescopic movement of the U-shaped side channels over the guide tracks, said winch frame including a U-shaped channel end frame member connecting the upper ends of the side frame channel members together, clamp means on the lower end of one of the side frame channel members for clamping engagement with one of said guide tracks for securing the same on the guide tracks, a winch shaft having cable drum means fixed thereon intermediate the ends thereof, winch shaft journal brackets fixed to and projecting from one face of said winch frame mounting said winch shaft for rotation therein with its axis offset at one side of said frame normal to said side frame channel members in a plane parallel to said frame and disposed downwardly from the end frame connecting member, a pulley bracket depending downwardly from said end frame connecting member substantially midway between the side frame channel members in a median plane through the side frame channel members, an ejection seat raising and lowering cable dead ended on said cable drum, a cable pulley journalled on said pulley bracket having a periphery extending beyond the plane of the side faces of said winch frame, said cable extending from said cable drum over said cable pulley and downwardly substantially midway between the side frame channel members, and separable securing means on the live end of said cable removably secured to the ejection seat for raising the ejection seat when said winch shaft rotated in one direction and lowering said ejection seat when said winch shaft is rotated in the opposite direction, and means for controlling rotation of said winch shaft in said opposite directions.

3. Apparatus as set forth in claim 2 in which said U-shaped channel end frame member is separably connected at one end to the upper end of one of said spaced U-shaped side channel members, and includes means for removably positively connecting the same together, whereby the U-shaped parallel side channel members are separable laterally from each other to receive the upper ends of the guide tracks laterally in the U-shaped channels and assembled to secure the upper ends of the tracks therein and therebetween, and a clamping tie rod means between the side channels for drawing the same toward each other.

4. A downward ejection seat removal and replacement device for airplanes having spaced parallel downward ejection seat guide rails formed with opposite parallel guide channels facing each other and an ejection seat slidably mounted in said channels for downward removal therefrom, said device comprising a rectangular channel frame having spaced parallel U-shaped side channel members facing each other adapted to telescope over the exterior upper end portions of said spaced parallel downward ejection seat guide rails, an upper end frame member fixedly connected at one end to the upper end of one said side channel members and removably connected at its opposite end to the upper end of the other side channel member, stop means fixed in said side channel members in materially upwardly spaced relation to the lower ends of said spaced side channel members for downward movement limiting engagement of said device with the upper ends of said ejection seat guide rails when said side channel members are telescoped over the upper ends of said guide rails, a cable winding shaft journalled on said parallel side channel members transversely thereof in downwardly spaced relation to said upper end frame member, a cable drum fixed on said shaft substantially midway between said side channel members, crank means fixed on said shaft for rotating said shaft and cable drum, a pulley journalled on said upper end frame member above said cable winding shaft and depending downwardly between said side channel members toward said shaft substantially midway between said side channel members, cable means secured at one end to and wound on said drum, said cable means extending upwardly over said pulley and then downwardly substantially midway between said side channel members, openable clamp means connected to the free end of said cable for removable connection to a downward ejection seat structure when the seat structure is mounted in the guide rails.

5. In a downward ejection seat raising and lowering device, an inverted U-shaped frame having a pair of U-shaped side channels facing each other in spaced parallel relation and shaped to receive the exterior upper end portions of the spaced parallel guide rails or tracks of an aircraft downward ejection seat structure therein in telescopic fashion, and an end channel member connected between said side channel members, stop means fixed in said facing side channel members intermediate the ends thereof for limiting the telescopic movement of said side channel members over the upper ends of the ejection seat guide rails, clamping means on the lower end of at least one end of said side channel members for securing engagement between said one of said side channel members and one of the guide rails when telescoped therein, cable winch means journalled on said side channel members in offset parallel relation to the plane of said inverted U-shaped frame and in downwardly spaced relation to said connecting end channel member, pulley means journalled on said connecting end channel member substantially midway between said side channel members and above said cable winch means, an ejection seat raising and lowering cable dead ended at one end on said winch means and extending upwardly over said pulley means and then downwardly between said side channel members for connection at its other end to an ejection seat when mounted in said guide rails, ejection seat releasable connecting means secured to the other end of said cable for releasable connection to the upper portion of an ejection seat when disposed in said side channel members, and ratchet means between said winch means and said U-shaped frame for arresting rotation of said winch means in cable unwinding direction to support the ejection seat in said side channels by said cable means.

References Cited in the file of this patent

UNITED STATES PATENTS

| | | |
|---|---|---|
| 156,541 | Conrad et al. | Nov. 3, 1874 |
| 574,917 | Lee | Jan. 12, 1897 |
| 2,203,113 | Uecker et al. | June 4, 1940 |
| 2,301,994 | Atkinson | Nov. 17, 1942 |
| 2,781,183 | Kaplan | Feb. 12, 1957 |
| 2,843,360 | Proctor | July 15, 1958 |